United States Patent [19]

Heinemann et al.

[11] 4,244,906

[45] Jan. 13, 1981

[54] PROCESS FOR MAKING PHENOL-ALDEHYDE RESINS

[75] Inventors: Karl-Heinz Heinemann; Georg Michalczyk, both of Neukirchen-Vluyn; Gerd Ripkens, Kamp-Lintfort, all of Fed. Rep. of Germany

[73] Assignee: Deutsche Texaco Aktiengesellschaft, Fed. Rep. of Germany

[21] Appl. No.: 38,613

[22] Filed: May 14, 1979

[30] Foreign Application Priority Data

May 16, 1978 [DE] Fed. Rep. of Germany ....... 2821294

[51] Int. Cl.³ .......................... C08G 8/04; C08G 8/10; C08G 14/04
[52] U.S. Cl. .................... 264/109; 260/29.3; 264/112; 264/113; 264/122; 528/147; 528/156
[58] Field of Search ...................... 528/136, 147, 156; 264/109, 112, 113, 122

[56] References Cited

U.S. PATENT DOCUMENTS

| | | | |
|---|---|---|---|
| 1,907,497 | 5/1933 | Caplan | 528/147 |
| 2,176,951 | 10/1939 | Bannister | 528/147 X |
| 2,231,860 | 2/1941 | Swallen | 528/136 X |
| 2,631,097 | 3/1953 | Redfern | 528/147 X |
| 2,631,098 | 3/1953 | Redfern | 528/147 X |
| 3,287,479 | 11/1966 | Naudain | 264/109 X |
| 3,474,065 | 10/1969 | Gburek et al. | 528/156 X |

OTHER PUBLICATIONS

Chem. Abstracts, vol. 36 1942, $4222^7$-$94223^1$ Ushakov et al.

*Primary Examiner*—Howard E. Schain
*Attorney, Agent, or Firm*—Carl G. Ries; Robert A. Kulason; Walter D. Hunter

[57] ABSTRACT

Phenol-aldehyde resins are prepared by condensing phenol with formaldehyde and isobutyraldehyde in the presence of an alkali. The resulting resins are particularly suited for manufacturing products such as fiberboard and chipboard.

14 Claims, No Drawings

PROCESS FOR MAKING PHENOL-ALDEHYDE RESINS

BACKGROUND OF THE INVENTION

1. Field of the Invention

This invention relates to a phenol-aldehyde resin which is particularly suited as a bonding agent for the manufacture of wood materials, such as fiberboard and chipboard. More particularly, this invention relates to phenol-aldehyde resins prepared from phenol, formaldehyde and isobutryaldehyde.

2. Prior Art

For the manufacture of wood materials, such as fiberboard and chipboard, alkaline-condensed phenol-formaldehyde resins are preferred as bonding agents, because they release only little formaldehyde, unlike urea and melamine resins, and because they impart to the finished panels very good mechanical properties, especially good water and weathering resistance. Hence phenol-formaldehyde resins are preferred as bonding agents for the manufacture of post-formable hardboard used in the building, automobile, furniture and interior decoration industries.

Wood materials, e.g. fiberboard, are manufactured by impregnating the fibers or chips with the aqueous bonding agent solution and adding mineral acid or aluminum sulfate until a pH-value of approx. 3.0 to 4.5 is attained, so that the resin precipitates and deposits on the fibers. The thus-glued fibers are then pressed at elevated temperatures to produce panels of the required size and thickness.

The resins employed as bonding agents in the preparation of wood fiber products must be such that the formed panels exhibit a satisfactory flexural strength after pressing and conditioning and prior to post-curing and the loss in flexural strength of the panels after immersion in water (for three minutes at 90° C.) must not be excessive.

SUMMARY OF THE INVENTION

This invention relates to phenol-aldehyde resins and to a process for manufacturing such resins which comprises condensing phenol with formaldehyde and isobutyraldehyde in the presence of alkali at a mole ratio of phenol:aldehyde:alkali of 1:1.52 to 1.62:0.50 to 1.30 and wherein 0.05 to 0.40 mole of isobutyraldehyde per mole of phenol is used. In another embodiment this invention relates to the use of these phenol-aldehyde resins in preparing wood material products.

Further, this invention is directed to a phenolic resin permitting the manufacture of wood materials having improved flexural strength and reduced loss in flexural strength after immersion in water.

DETAILED DESCRIPTION OF THE INVENTION

One embodiment of the present invention is a phenol-aldehyde resin produced by condensing phenol with formaldehyde and isobutyraldehyde in the presence of alkali at a mole ratio of phenol:aldehyde:alkali of 1.0:1.52 to 1.62:0.50 to 1.30 wherein 0.05 to 0.40 mole of isobutyraldehyde per mole of phenol is used.

It has been surprisingly found that the problem can be solved by exchanging a certain amount of the formaldehyde for isobutryaldehyde. Phenolic resins are commonly produced by employing formaldehyde as the aldehyde component. Though it has been disclosed in the literature that formaldehyde may be replaced by other aldehydes, such as acetaldehyde, propionaldehyde, etc., it has been held in such disclosures that the aldehyde structure is less important with regard to the resin properties than the phenol structure. Only when combined with acidic catalysts, i.e. in the manufacture of novolaks, higher aldehydes are of some interest; for instance, formaldehyde is replaced by acetaldehyde, if soluble, meltable resins are required. It should be mentioned in this connection that an isobutyraldehyde-phenolic resin has been disclosed in DE-OS 26 05 482, in which reference the condensation was conducted in the presence of a strongly acidic catalyst and the resulting product is recommended as a tackifier for caoutchouc. Since higher aldehydes in the presence of alkaline catalysts are less reactive, cause undesired side reactions and are expensive, formaldehyde is preferred to other aldehydes (see Kirk Othmer "Encyclopedia of Chem. Techn." 1953, Vol. 10, p. 339).

Therefore, as previously pointed out, the art offered no clue that isobutyraldehyde incorporated by condensation into alkaline-condensed phenolformaldehyde resins would improve the properties of the cured product. It has been found that by exchanging 0.05 to 0.40, preferably 0.08 to 0.18 mole of formaldehyde per one mole of phenol for isobutyraldehyde, i.e. 3 to 25, preferably 5 to 11 weight percent of the 37 weight percent aqueous formaldehyde solution for isobutryaldehyde, the flexural strength of fiberboard produced with such a phenolic resin is noticeably improved and the loss in flexural strength after immersion in water is surprisingly low. If less than 3 weight percent of the 37 weight percent aqueous formaldehyde solution is replaced by isobutryaldehyde, the improvement of the above mentioned properties is accordingly less distinct. If the isobutryaldehyde content, however, is raised to more than 25 weight percent, longer curing times are required making the manufacture of panels too expensive.

The following table shows preferred embodiments of the present invention:

TABLE I

| Isobutryaldehyde Content in the 37 weight percent formaldehyde solution | Mole Ratio | | |
|---|---|---|---|
| | Phenol | Formaldehyde | Isobutryaldehyde |
| 5 weight % | 1 : | 1.44 : | 0.08 |
| 8 weight % | 1 : | 1.44 : | 0.13 |
| 11 weight % | 1 : | 1.44 : | 0.18 |

The NaOH content of the above products is 0.5, 0.795, and 1.30 mole, respectively per mole of phenol.

Instead of the pure phenol, a substituted phenol, e.g. substituted with lower alkyl groups ($C_1$–$C_4$), such as a cresol, is also suitable in the process of this invention, but phenol is preferred for economic reasons. An alkali metal hydroxide, e.g. potassium hydroxide solution and sodium hydroxide solution, is preferred as the curing agent. The formaldehyde is preferably used as a commercial 37 weight percent solution.

The phenol-aldehyde resins of this invention are prepared by heating the monomers in aqueous solution to approximately 60° to 80° C.; adding the alkali as an about 45–55 weight percent solution slowly enough to avoid noticeable temperature increases. After addition of all of the alkali solution, the temperature is increased approximately to the boiling point and condensation is continued until the viscosity of the resin corresponds to a flow time of 30 to 50 seconds (DIN No. 53211 (German Industrial Standard), 4-mm DIN cup; 20° C.) and a solids content of approx. 38 to 42, preferably 40, is attained.

The resins of this invention may be utilized in the manufacture of fiberboard by diluting the resin with water, preferably process water, to a solids content of approx. 15 to 25 weight percent; adding to this solution a paraffin emulsion as the waterproofing agent and impregnating the fibers with the resin solution. Fir-wood and pine-wood fibers are particularly suitable. The glue may be applied in accordance with any of the known methods, e.g., admixing with the fiber pulp in a vat or spraying of the resin onto the agitated fibers. By addition of a mineral acid such as hydrochloric or sulfuric acid, or an acid salt such as aluminum sulfate, etc. the pH-value is then adjusted to 3.0 to 4.5, preferably 4.0 to 4.5, whereupon the resin precipitates and deposits on the fibers.

The glued fiber pulp is then pressed to form panels of the desired size. Pressure and temperature are dependent on the panel thickness, the water content in glue and fibers, etc. Curing is preferably done at two pressure phases, viz. a short high-pressure phase (250 to 270 bar) and a low-pressure phase (50 to 70 bar). The temperature ranges from approx. 180° to 220° C.

The flexural strength, reflecting the dimensional stability of wood panels under load is determined in accordance with DIN (German Industrial Standard) No. 52 362 where the test bars cut from the finished panels are laid upon two supports and deflected until rupture. The loss in flexural strength is determine by deflecting test specimens from the same panels after immersing them for three minutes in water having a temperature of 90° C. The loss in flexural strength is the difference between the flexural strength prior to immersion in water and the flexural strength thereafter.

The following examples illustrate the advantages of the instant embodiments of this invention and are to be considered not limitative.

EXAMPLE I

Manufacture of the resin in accordance with the present invention

A feed composed of 244 kgs of phenol, 303 kgs of a 37 weight percent aqueous formaldehyde solution, 24 kgs of isobutryaldehyde, and 270 kgs of water (mole ratio of phenol:formaldehyde:isobutryaldehyde:- NaOH = 1:1.44:0.13:0.795) was charged to a stirred reactor. The mixture was heated to 70° C. while being stirred, and then the 50 weight percent aqueous sodium hydroxide solution (165 kg) was slowly added so that the temperature did not noticeably increase. Feeding of the sodium hydroxide solution was completed after two hours following which the mixture was heated to 95° C. and condensed until the flow time was 25 seconds (DIN 53 211, 4-mm DIN cup, 20° C.).

EXAMPLE II

Manufacture of fiberboard using the resin described in Example I

The phenolic resin of Example I was diluted with process water to a concentration of 20 weight percent and applied together with a paraffin emulsion (approx. 50 weight percent paraffin emulsified in water) to fir-wood fibers. The resin was precipitated by adjusting the pH-value of the glued fibers to 4.4 by addition of aluminum sulfate. At a throughput ot 0.49 metric ton/hr. of resin, 0.195 metric ton/hr. of paraffin emulsion, and 6.5 metric tons/hr. of fiber pulp the resulting dry fiberboard contained 2.5 weight percent resin (relating to precipitable resin) and 1.5 weight percent paraffin. The thus-glued fibers were pressed for about one minute at 175° C. and 265 bar and for about two minutes at 59 bar.

Flexural strength and loss in flexural strength after immersion in water were determined on test bars cut from the finished panels and these results are compared in Table 2 with the results obtained with the same tests conducted on specimens of panels prepared with a commercial wood binder. This commercial binder was a phenol-formaldehyde resin produced by condensing phenol and formaldehyde in the presence of alkali at a mole ratio of 1:1.57:0.77.

TABLE 2

| | Panels prepared with | Flexural Strength (DIN₂52 362), *N/mm² | Loss in Flexural Strength |
|---|---|---|---|
| (A) | resin according to prior art | 45.2 | 29.4 |
| (B) | resin according to the present invention, (relating to 1 mole of phenol) | | |
| (B-1) | 0.05 mole of isobutryaldehyde, according to Example 1 | 50.3 | 17.6 |
| (B-2) | 0.13 mole of isobutyraldehyde, according to Example 1 | 66.8 | 9.8 |
| (B-3) | 0.18 mole of isobutyraldehyde, according to Example 1 | 73.0 | 9.0 |
| (B-4) | 0.4 mole of isobutryaldehyde, according to Example 1 | 79.2 | 8.3 |

*N/mm² =

What is claimed is:

1. Phenol-aldehyde resins prepared by condensing phenol with formaldehyde and isobutyraldehyde in the presence of an alkali wherein the mole ratio of phenol:aldehyde:alkali ranges from 1:1.52 to 1.62:0.50 to 1.30 and wherein 0.05 to 0.40 mole of isobutyraldehyde per mole of phenol is employed.

2. The resin of claim 1 wherein mole ratio of phenol:-formaldehyde:isobutyraldehyde is 1:1.44:0.08 to 0.18.

3. A process for preparing phenol aldehyde resins which comprises condensing phenol with formaldehyde and isobutyraldehyde in the presence of an alkali wherein the mole ratio of phenol:aldehyde:alkali ranges from 1:1.52 to 1.62:0.50 to 1.30 and wherein 0.05 to 0.40 mole of isobutyraldehyde per mole of phenol is employed.

4. The process of claim 1 wherein mole ratio of phenol:formaldehyde:isobutyraldehyde is 1:1.44:0.08 to 0.18.

5. The process of claim 3 wherein phenol, formaldehyde as a 37 weight percent aqueous solution and isobutyraldehyde as an aqueous solution are heated to 60°–80° C. with stirring and the alkali as an about 45–55 weight percent solution is slowly added, the resulting mixture is then heated to about 100° C. and this temperature is maintained until the viscosity of the resin corresponds to a flow time of about 30 to 50 seconds as measured in a 4 mm DIN cup at 20° C. and the solids content is about 38 to 42 weight percent.

6. The process of claim 3 wherein the said alkali is selected from the group consisting of sodium hydroxide and potassium hydroxide.

7. The process of claim 1 wherein the said alkali is sodium hydroxide.

8. The process for making a fiberboard product which comprises diluting the phenol aldehyde resin of claim 1 with water to form a mixture with a solids content of about 15 to 25 weight percent, adding a paraffin emulsion to the said resin mixture, applying the said resin mixture to a material selected from the group consisting of wood fibers and wood chips, precipitating the said resin mixture by addition of a mineral acid or salt thereof, subjecting the thus-treated material to a pressure to about 225 to 275 bar at a temperature of about 180° to 220° C. for about 1 to about 5 minutes and finally at a pressure of about 260 to 270 bar at the same temperature for about 1 to about 10 minutes thereby forming the fiberboard product.

9. The process of claim 8 wherein the said mineral acid salt is aluminum sulfate.

10. The process of claim 8 wherein the said paraffin emulsion is about 50 weight percent paraffin emulsified in water.

11. The process of claim 8 wherein the said material is wood fibers.

12. The process of claim 8 wherein the phenol aldehyde resin of claim 1 is diluted with sufficient water to form a mixture with a solids content of about 20 weight percent.

13. The process of claim 8 wherein the resin mixture is applied by admixing with the said material.

14. The process of claim 8 wherein the resin mixture is applied by spraying onto the said material maintained in an agitated state.

* * * * *